Feb. 3, 1970 W. BROOKS 3,493,933

SHIFT REGISTER CONTROL CIRCUIT FOR VARIABLE MESSAGE DISPLAYS

Original Filed June 13, 1966 4 Sheets-Sheet 1

INVENTOR
WILLIAM BROOKS

Owen, Wickersham & Erickson
ATTORNEYS

SHIFT REGISTER CONTROL CIRCUIT FOR VARIABLE MESSAGE DISPLAYS

Original Filed June 13, 1966

INVENTOR
WILLIAM BROOKS

Owen, Wickersham & Erickson
ATTORNEYS

INVENTOR
WILLIAM BROOKS
Owen, Wickersham & Erickson
ATTORNEYS

INVENTOR
WILLIAM BROOKS
Owen, Wickersham & Erickson
ATTORNEYS

United States Patent Office 3,493,933
Patented Feb. 3, 1970

3,493,933
SHIFT REGISTER CONTROL CIRCUIT FOR VARIABLE MESSAGE DISPLAYS

William Brooks, 1042 Inverness Way, Sunnyvale, Calif. 94087

Original application June 13, 1966, Ser. No. 557,148. Divided and this application Feb. 4, 1969, Ser. No. 810,434
Int. Cl. G09f *9/32;* G11c *19/00*
U.S. Cl. 340—168 1 Claim

ABSTRACT OF THE DISCLOSURE

A shift register having a plurality of stages arranged serially between a first stage and a last stage, a shift control switch for opening and closing a positive D-C bus, each said stage having a silicon controlled rectifier with its cathode connected to a negative D-C bus, a first rectifier in each stage connected to the positive D-C bus and preventing passage of current back thereto, a load in each stage connected between the first rectifier and the anode of the silicon controlled rectifier, a first condenser in each stage connected at one side between the load and the first rectifier, a first resistor in each stage connected at one end between the load and the anode, a second condenser in each stage connected at one side to the other side of the first condenser and to the other end of the first resistor, a second resistor in each stage connected in series between the other side of the second condenser and the negative bus, a second rectifier and a third resistor connected in series to the gate of the silicon controlled rectifier of each stage except the first and connected to the preceding stage between the second condenser and the second resistor, and code input means connected to the gate of the first stage.

This application is a division of application Ser. No. 557,148 filed June 13, 1966.

This invention relates to an improved shift register. It can be used in variable message displays.

One type of variable message display is exemplified by a sign made up of many electric lamps and alternating between displaying the time of day and the current temperature. This type thus may be generalized as one which changes from one static display to another. Other examples of this type are travel departure and arrival boards at air, rail, and bus terminals, stock quotation boards, score boards at sporting events, and changing advertising signs.

Another type of variable message display is the continuously changing type, exemplified by a news dispatch sign in which a message begins at the right end and moves by small stages rapidly to the left end, giving the impression of a smoothly moving message.

The present invention applies to both of these types of variable message displays, to mixtures of them, and to other types as well. The message may be given by words, letters, numbers, symbols, pictures, or geometrical elements.

The invention relates particularly to the control of such displays and to the simplification of the control systems.

Heretofore, variable message displays have used mechanical switching means, including complex electromechanical devices to operate mechanical switches, which in turn, were used to control lamps in the actual visual display board. The mechanical controls both limited the speed with which the messages could be changed and necessitated frequent adjustment and cleaning. Moreover, these mechanical control systems have been expensive, and their installation has required a large number of control wires; furthermore, the enlargement or expansion of such a display board was complex and expensive. The extensive wiring between the control means and the actual display was a major cost feature, particularly when the control device was to be remote from the display; for a separate wire had to be run from each display lamp to the control device. Not only was this expensive, but the display itself was necessarily bulky—it could not easily be made small.

One object of the present invention is to provide a less expensive, smaller, and simpler system for variable message display.

Another object is to impart a new flexibility to visual display.

Another object of the invention is to provide a visual display in which the control means is electronic instead of mechanical.

Another object is to enable remote control of display and multiple display spaces, in a system wherein the elements can be connected and controlled by a minimum of control wires. Displays of the present invention may be controlled remotely by radio or by telephone wires.

The present invention is characterized by its use of electronic shift registers. While shift registers are well known in the computer art, they have not, to my knowledge, heretofore been used in visual displays, and I have found that many important benefits may be obtained from their storage and transfer of information. By a shift register, I refer to a circuit in which information stored in a first element is transferred to a second adjacent element on each command shift. Such a shift register enables information to be received in serial form and loaded into the register so that at the conclusion of the serial input code, a meaningful message is stored in the register.

Another object of the invention is to provide improved electronic shift registers that are especially useful in the control of variable message displays.

Other objects, advantages, and features of the invention will become apparent from the following preferred example.

Figure 1:
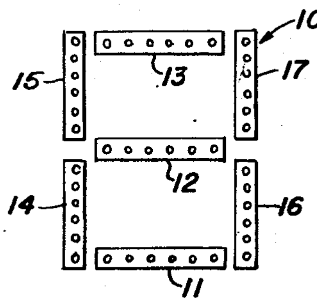
FIG. 1 is a figuregram composed of seven bars, each of which may be composed of several elements.

Variable message displays typically rely on figuregrams or lettergrams to form the numerals or letters to be displayed. FIG. 1 shows such a figuregram 10 made up of seven bars 11, 12, 13, 14, 15, 16, and 17. Two bars 16 and 17 are vertical on the right-hand side of the figuregram 10 and are arranged in line with each other, the bar 16 being at the bottom half, the bar 17 at the top half. Similar bars 14 and 15 are at the left-hand side of the figuregram 10. The bars 11, 12, and 13 are horizontal, the bar 13 lying at the top, and bar 11 at the bottom, and the bar 12 in the middle. Each of the bars of this figuregram 10 may be made up of several lamp globes or neon tubes or a single fluorescent lamp, or any other suitable structure.

Figure 2:
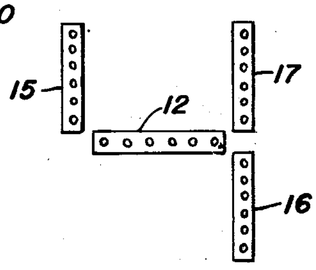
FIG. 2 is a pattern of selected bars of the figuregram of FIG. 1 which may be lighted to produce a figure "4."
Figure 3:
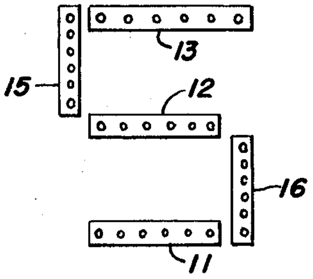
FIG. 3 is a pattern of bars from the same figuregram of FIG. 1 which are lighted to produce a figure "5."

Various combinations of bars are lighted one at a time, each combination producing a visual display element. Thus, the bars can be selectively lit so as to form the numerals zero through nine. For example, when the FIG. 1 figuregram 10 is completely lighted, it produces the Arabic numeral for eight. FIG. 2 shows only the bars which are lighted to produce the numeral four, these being the bars 12, 15, 16, and 17. This time, the remaining bars are left dark or unlighted. Similarly, FIG. 3 shows that by lighting only the bars 11, 12, 13, 15, and 16, the numeral five is displayed.

Using conventional binary notation with the numeral "1" representing an "on" condition and a zero representing the "off" condition, the table shows the code for displaying each of the ten Arabic numerals by means of the seven-bar figuregram 10. The code reads from right to left, with the far right position representing the bar 17; the bar 17 is lighted when there is a "1" at the far right and is dark when there is a zero there. The next position to the left of the far right represents the bar 16, and so on.

TABLE

| Numeral: | Code |
|---|---|
| 1 | 0000011 |
| 2 | 1111001 |
| 3 | 1110011 |
| 4 | 0100111 |
| 5 | 1110110 |
| 6 | 1111110 |
| 7 | 0010011 |
| 8 | 1111111 |
| 9 | 0110111 |
| 10 | 1011111 |

Figure 4:
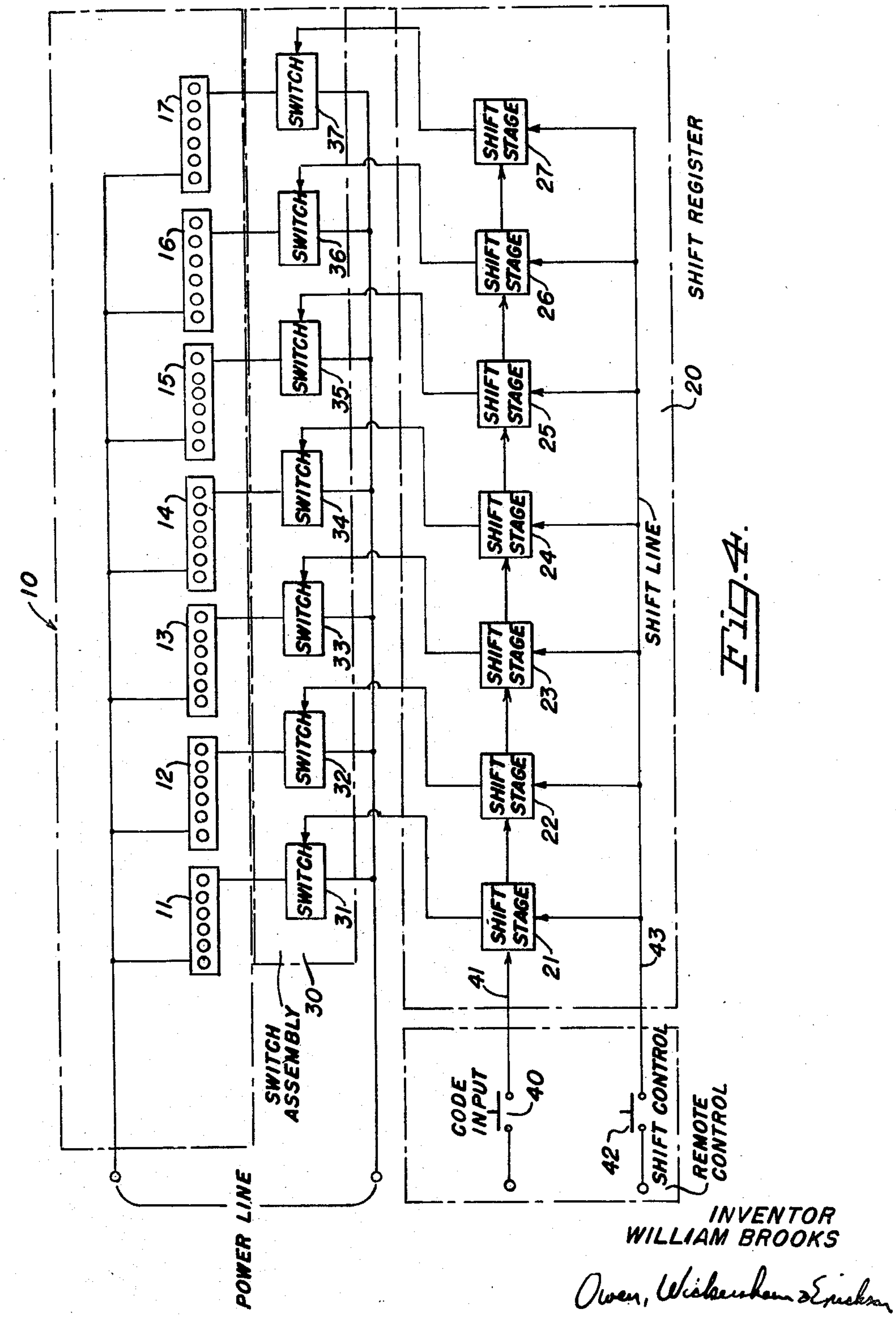
FIG. 4 is a block-type circuit diagram of a variable message display embodying the principles of the invention and employing a seven-bar shift register to control the figuregram of FIG. 1.

In the present invention, the figuregram 10 of FIG. 1 is controlled by a seven-stage shift register 20 and a switch assembly 30. The seven stages are 21, 22, 23, 24, 25, 26, and 27, each controlling a switch 31, 32, 33, 34, 35, 36, 37 which in turn controls one figuregram bar 11, 12, 13, 14, 15, 16, 17. Thus, in the diagram shown in FIG. 4, the bar 11 is controlled by a first shift stage 21 through the switch 31; the bar 12 is controlled by the stage 22 through the switch 32; and so on, the bar 17 being controlled by the stage 27 through the switch 37. In some instances, the switches 31, 32, 33, 34, 35, 36, and 37 may be an integral part of the shift register 20. It is apparent that a more complex figuregram having some diagonals or other figurations would be controlled by employing a shift register having more stages. When the proper serial code (of the table) is presented to the code input switch 40 of the shift register 20, then when the entire code for any numeral has been put in, that numeral is displayed according to its code. An important feature of the invention is that the code input 40 for this entire circuit may be remote and requires a single wire 41 to connect it to the shift register 20; moreover, only the input stage of the register 20 requires a control signal input. A shift control switch 42, for changing the message, requires only a single wire 43.

Figure 5:
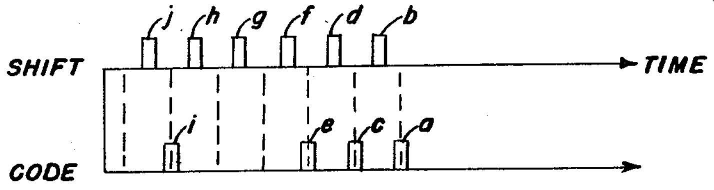
FIG. 5 is a diagram showing the relation between time, shift, and code in the circuit of FIG. 4.

FIG. 5 shows the time relationship between the code input and the shift control. Thus, to display the numeral "4" (as in FIG. 2) on the figuregram 10, by means of the binary code 0100111, a current pulse *a* is first fed to the code input 40, putting the first stage 21 in "on" condition. This is at once followed by a current pulse *b* to the shift control 42, causing this "on" condition to shift from the first stage 21 to the second stage 22. (The mechanism of shift will be fully explained below with reference to FIG. 7.) The first stage 21 is now "off."

Now, in our example of the code 0100111, a current pulse *c* is fed to the code input 40, again placing the first stage 21 in "on" condition, and when the second shift pulse *d* is fed to the shift control 42, the "on" condition of the second stage 22 is transferred to the third stage 23, while the "on" condition of the first stage 21 is shifted to the second stage 22, and the first stage 21 is off. However, a new pulse *e* to the code input 40 energizes the first stage 21 again.

The third shift pulse *f* causes the "on" conditions to be transferred from the third stage 23 to the fourth stage 24, from the second stage 22 to the third stage 23, and from the first stage 21 to the second stage 22.

No pulse is applied to the code input 40 between the third shift pulse *f* and the fourth shift pulse *g*. Hence, the fourth pulse *g* causes the "on" conditions to shift from the fourth stage 24 to the fifth stage 25, from the third stage 23, to the fourth stage 24, and from the second stage 22 to the third stage 23, but the first stage 21 and second stage 22 are "off." Once again, there is no code-input pulse between the pulse *g* and the fifth shift pulse *h*; so the shifts put "on" the sixth stage 26, the fifth stage 25, and the fourth stage 24, while the first three stages 21, 22, and 23 are off.

The code applies a pulse *i* to the first stage 21, and the sixth shift pulse *j* transfers the "on" condition to the second stage 22, while also shifting the "on" condition to the fifth stage 25, sixth stage 26, and seventh stage 27. The third and fourth stages 23 and 24 are off, and since there is no further pulse to the code input 40, the first stage 21 remains off, reproducing now the code 0100111. As a result, only the bars 12, 15, 16, and 17 are lighted, and the numeral "4" is displayed, as in FIG. 2. A change in the message is made simply by feeding in a new code when desired.

The code input can be quite rapid, so rapid that to the eye it seems as though the numeral "4" is displayed at once, and there need be no flashing on and off of the bars during the shift process. Stepping switches or other shift registers may be used to control the switches 40 and 42. It can all be done electronically, or it may be done manually or mechanically. The code may be put on punched tape or cards, or other prepared coding devices.

Figure 6:
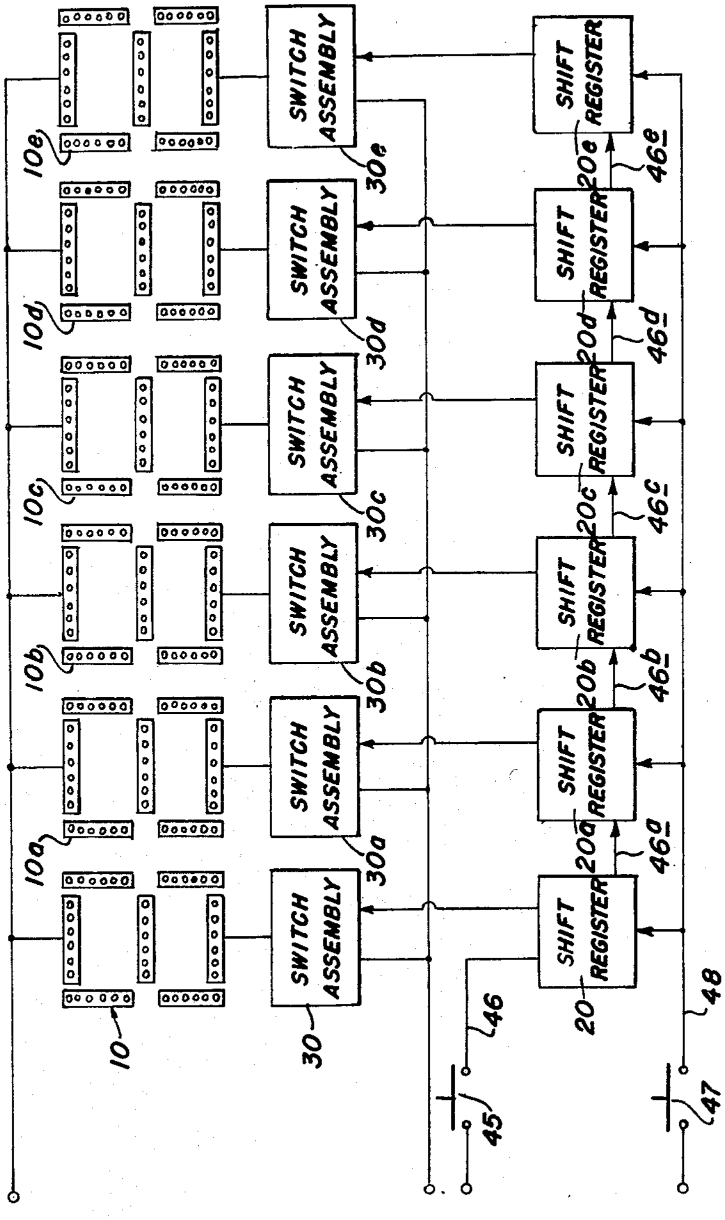
FIG. 6 is a block diagram of a variable message display of this invention involving a plurality of figuregrams and shift registers.

As shown in FIG. 6, a number of shift registers 20, **20*a*, 20*b*, 20*c*, 20*d*, and 20*e* may be connected together in serial fashion, and if each one of them controls a figuregram 10, 10*a*, 10*b*, 10*c*, 10*d*, and 10*e*, each having seven elements, then each shift register 20, 20*a*, 20*b*, 20*c*, 20*d*, and 20*e* will have its seven stages, and one code group after another may be presented to a single input stage 45 in order to display a string of numbers in order of the input code group. Only one wire 46 is required still for code input control, and it is an important feature of this invention that a string of numbers of any length can be controlled by a single input control wire 46, each shift register 20 etc., being connected to the succeeding shift register 20*a* by a next-set control wire 46*a*, 46*b*, 46*c*, 46*d*, 46*e*. It will be apparent that this technique can be applied to an airport departure board to display flight numbers, time, and gate numbers. Again there is a single shift control 47 and a single shift control wire 48. In suitable circuits the wire 48 may be replaced by ground. Each of the switch assemblies 30, 30*a*, 30*b*, 30*c*, 30*d*, and 30*e*** may be made quite simple, as by printed circuitry, or may even be a minor component of their respective shift registers.

Shift registers using vacuum tubes or magnetic cores or transistors or other semi-conductor compound elements are well known in the art and any true shift register having sufficient stages may be used in this invention. It may be remarked that some circuits which are called shift register in the literature are really nothing but ring counters, which transfer a count from stage to stage of each transfer command. Many of these ring counter circuits allow more than one stage to be on at any one time. However, such ring counters do not transfer a count when two successive stages are in the same state whereas a true shift register will. Thus, while a large number of circuits have been published showing silicon controlled rectifiers in ring counters, and while some of these have mistakenly been called shift registers, they are not properly so termed.

Figure 7:
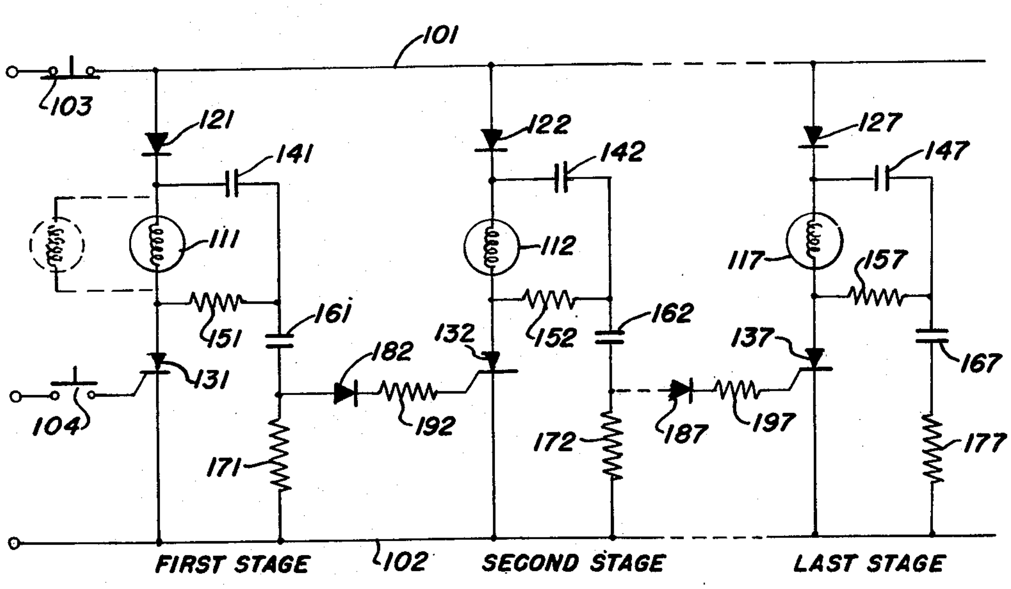
FIG. 7 is a fragmentary circuit diagram of a modified form of the invention using power shift register.

FIG. 7 shows a novel power shift register which employs only silicon controlled rectifiers, without transfluxors. The shift register of FIG. 7 has a number of unique features, not the least important of which is the fact that it is a true shift register which is also capable of handling high power.

This is a direct-current system, having a positive bus 101 and a negative bus 102. A shift control 103 is in the positive bus 101, and a code input 104 is also in a positive lead.

In each stage, there is a lamp 111, 112 . . . 117 (or a lamp group corresponding to the bars 11 etc.), separated from the positive bus 101 by a diode rectifier 121, 122 . . . 127. The lamps 111, 112 . . . 117 are each connected to the anode of a silicon controlled rectifier 131, 132 . . . 137. The cathode of each SCR 131, 132 . . . 137 is connected to the negative bus 102. The code input 104 is connected to the gate of the first SCR 131.

In each stage, there is also a condenser 141, 142 . . . 147 connected at one side between the lamp 111, 112 . . . 117 and the diode 121, 122 . . . 127. Also, a resistor 151, 152 . . . 157 is connected at one end between the lamp 111, 112 . . . 117 and the SCR 131, 132 . . . 137. The other sides of that condenser 141, 142 . . . 147 and resistor 151, 152 . . . 157 are connected together and to one side of a condenser 161, 162 . . . 167. The condenser 161, 162 . . . 167 leads to the negative bus 102 through a resistor 171, 172 . . . 177.

Between each condenser 161, 162 . . . except for the last one 167 and its resistor 171, 172 (except for the last one 177) is a connection to the gate of the succeeding SCR 132 . . . 137, through a diode 182 . . . 187 and a resistor 192 . . . 197.

Typical values or types are as follows:

| | | |
|---|---|---|
| Lamps **111, 112** . . . **117** | watts | 40–150 |
| Diodes **121, 122** . . . **127** | | 1N4003 |
| Silicon controlled rectifiers **131, 132** . . . **137** | | 2N3528 |
| Condensers **141, 142** . . . **147** | microfarad | 0.1 |
| Resistors **151, 152** . . . **157** | ohms | 680 |
| Condensers **161, 162** . . . **167** | microfarad | 0.05 |
| Resistors **171, 172** . . . **177** | ohms | 500 |
| Diodes **182** . . . **187** | | 1N34 |
| Resistors **192** . . . **197** | ohms | 1000 |

Assuming all stages off at the beginning of a program, an input pulse is applied by the code input 104 to the gate terminal of the first silicon controlled rectifier 131. The SCR 131 conducts and latches "on" (fires), as a result, the condenser 161 discharges through the resistor 151 and approaches the common ground potential. This causes a negative pulse across the resistor 171 which is blocked from the gate of the SCR 132 by the diode 182. The lamp bank 111 connected to the anode of the silicon controlled rectifier 131 then lights with nearly the entire supply voltage being applied across the lamps 111. The condenser 141 then charges to nearly the supply voltage after the silicon controlled rectifier 131 is fired.

When the shift command 103 opens the plus supply bus 101 for a short period, the rectifier 131 goes out, due to the lack of the minimum holding current to it and the condenser 141 starts to discharge through the resistor 151 and the lamp bank 111. The condenser 141 is prevented from discharging through any other silicon controlled rectifier (via the common plus bus 102) by the diode 121. If the supply voltage is reapplied before the condenser 141 discharges very much, then a high charging current flows to charge the condenser 161. A positive trigger to the rectifier 132 is then applied to it through the diode 182 due to the charging current, which then fires the silicon controlled rectifier 132.

After the two rectifiers 131 and 132 have fired, the shift pulse 103 opens the plus bus 102, and both of these rectifiers 131 and 132 go out. If the trigger is supplied to the rectifier 131 so that it will trigger immediately upon reapplication of the bus voltage, and since it has previously been fired, the condenser 161 will have been discharged and the condenser 141 will be charged merely to supply voltage, less the amount of discharge current through the resistor 151. The condenser 141 then recharges to the supply voltage and in so doing draws current through the resistors 171, which retriggers the rectifier 132 of the second stage. Thus, the condenser 141 acts as a memory unit to determine whether the 131 has been fired or not. If the rectifier 131 had not been fired, then the condenser 141, having no potential across it (since no voltage would have been developed across the circuit of tha lamp 111 and resistor 151 to charge it), would have been unable to send its signal on to the SCR 132. If the silicon controlled rectifier 131 had not been fired, then the condenser 161 would have been charged to the supply voltage, and the reapplication of the plus bus voltage would not cause any current through the resistor 171 to trigger the second rectifier 132. A similar operation continues it through the various stages.

Other forms of electronic shift registers which are known in the computer art may be adapted as control object for display systems of this invention. However, in general the shift registers that have been used in the computer art are suitable only for low power, low level signals and are not suitable for driving high level display systems where the currents are quite substantial. Hence the importance of the shift register shown in FIG. 7.

The display systems discussed so far are those which are static for a time and which are completely changed for the whole sign at once. Such an example is that of a conventional time-temperature display in which the sign flashes the temperature for a few seconds and then flashes the time for a few seconds and then returns to the then-current temperature. This device is suitable for that use, and the input signal for each of these can be connected to a clock in one instance and a thermometer in the other to give the proper signal.

However, the invention is also useful to traveling message displays, where the copy appears to move across the display face. Such displays are used to present news and weather in public places and are already well known, though heretofore they have required very complex mechanical setups and a tremendous amount of wiring. The copy that can be displayed is not limited to numerals or to letters; it may be cartoons or any other kind of symbols or pictures. In using this kind of traveling display, the shift register elements need not necessarily be connected in the form of figuregrams. A typical application shown in FIG. 9 will make clear how the shift register system can be applied.

Figure 8:
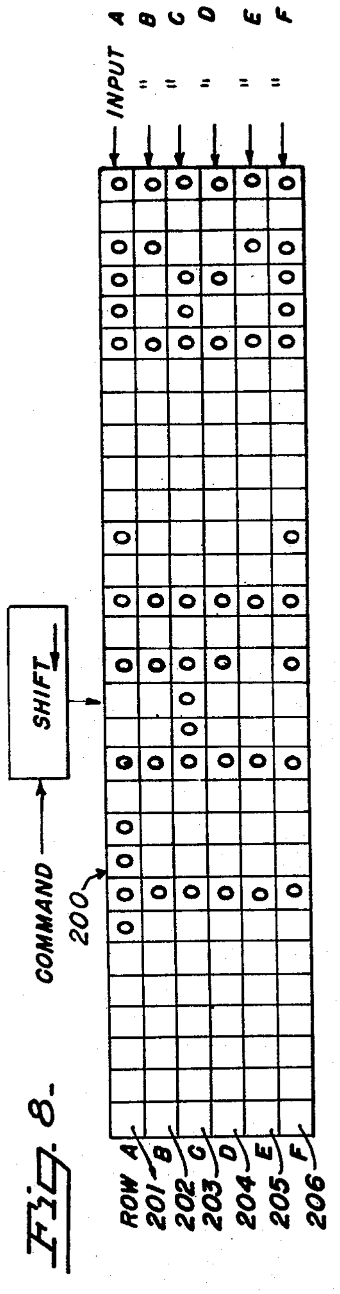
FIG. 8 is a view partly representational in elevation and partly diagrammatic of a sign illustrating the operation of a type of shift register controlled variable message display spelling out words and moving them from right to left across the sign.

In FIG. 8 it is desired to present continuous news copy to a display 200. In this instance, by way of example, the display elements are arranged in six horizontal rows 201, 202, 203, 204, 205, and 206, as many rows being used as are necessary to form pleasing forms, such as alphabet letters. Each horizontal row of lights is the load portion of a shift register which shifts information from right to left at each shift command. Each row is part of one shift register (e.g. of the type shown in FIG. 7) and operates in the same manner, except for the shift being from right to left instead of left to right. Each shift register has as many stages as there are vertical columns; for example, if there are thirty vertical columns, each shift register has thirty stages. The input of the shift registers is at the right.

Thus, each horizontal row 201, 202, 203, 204, 205, and 206 represents a line display controlled by a shift register. The inputs are first applied to the desired rows at the far-right vertical column. The first command to shift moves the input from this column one column to the left; the next command to shift moves the input another column to the left, and so on. Thus, the message moves across the display from right to left at each command. Here the word "the" and a portion of another word beginning with "B" are shown in one position. At the next command it would appear one lamp to the left, and so on. At each shift command, each illuminated element appears to move one space to the left; in other words, the configuration in the vertical line is moved to the next vertical line to the left. By controlling the input circuit, various letters, numbers, and symbols can thus be made to travel across the display.

The electronic shift of these shift registers is or can be quite rapid. It can be quite slow and steady, or it can be rapid and intermittent. Therefore, the message can be made to travel quickly to any portion of the sign and stop. During the rapid travel the display elements (the lamps) do not glow brightly enough for the eye to see them, so that the visual effect is that the message suddenly appears on the display. In this manner, variable message displays can be made to flash on and off. Similarly, cartoons can be created on the display with a rapid sequence of frames while the animation technique similar to that used in motion pictures creates the same general effect. Multicolor effects can be obtained by using three lamps (for example, blue, green, and red) at each lamp location, the three being located close to each other and rapidly scanning on the three colors in sequence with the brightness of each color adjusted so that the eye sees a hue which combines with the others. This technique is somewhat similar to that used in three-color printing sometimes called full-color halftone.

The codes and examples described above are not to be construed as limits on the shift register technique of this invention. For example, certain types of display elements presently use a projection principle in which a single lamp selected from a matrix of lamps is made to illuminate a mask which acts like a film in a picture projector and throws an image onto the screen. A series of these units may be placed side by side to form lines of copy, and the shift register serial code, consisting of pulses, spaced so that one lamp per display element is selected, may be used to obtain the desired effect.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A shift register having a plurality of stages arranged serially between a first stage and a last stage, including in combination:

a source of direct current having a positive bus and a negative bus, a shift control switch for opening and closing said positive bus, each said stage having a silicon controlled rectifier with a cathode connected to said negative bus, an anode, and a gate, a first rectifier in each stage connected to said positive bus and preventing passage of current back thereto, a load in each stage connected between said first rectifier and said anode, a first condenser in each said stage connected at one side between said load and said first rectifier, and having a second side, a first resistor in each said stage connected at one end between said load and said anode and having a second end, a second condenser in each said stage having a first side connected to both the second side of said first condenser and the second end of said first resistor and having a second side, a second resistor in each said stage connected in series between the second side of said second condenser and said negative bus, a second rectifier and a third resistor connected in series to the gate of the silicon controlled rectifier of each stage except the first and connected to the preceding stage between the second condenser and the second resistor, and code input means connected to the gate of said first stage.

References Cited

UNITED STATES PATENTS

| | | | |
|---|---|---|---|
| 3,283,312 | 11/1966 | Marcus et al. | |
| 3,341,717 | 9/1967 | McCracken | 307—224 XR |
| 3,408,509 | 10/1968 | Niehaus | 307—225 |

DONALD J. YUSKO, Primary Examiner

U.S. Cl. X.R.

328—37